April 16, 1929. J. M. BOYKOW 1,709,457
STABILIZATION OF MOVING OBJECTS SUCH AS AIRCRAFT AND WATER CRAFT
Filed Feb. 4, 1927
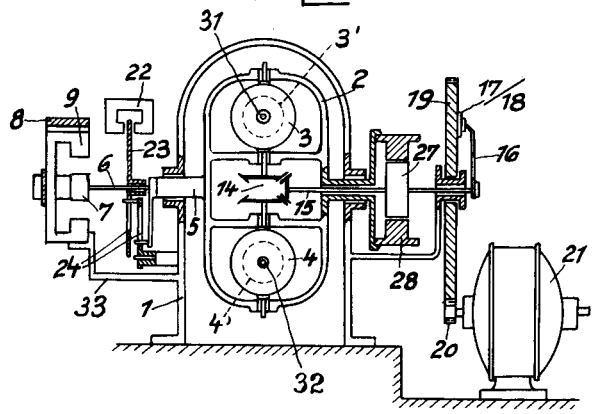
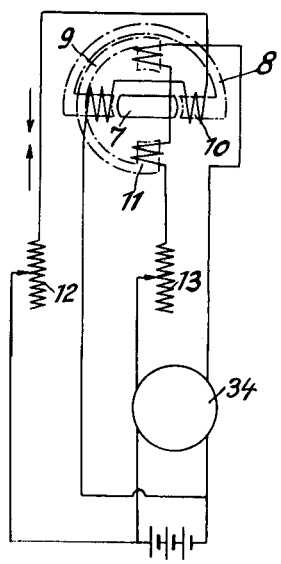
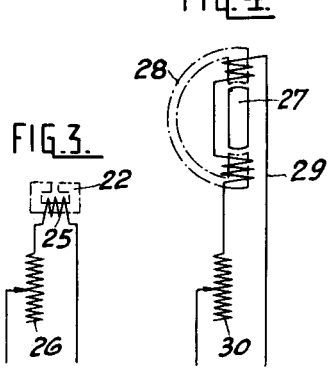
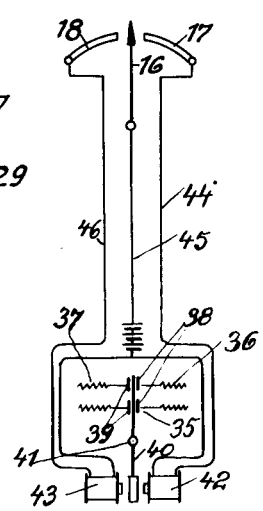
Inventor:
Johann Maria BOYKOW
by Lorka, Kellenbeck & Farley
Attorneys Patented Apr. 16, 1929.

1,709,457

UNITED STATES PATENT OFFICE.

JOHANN MARIA BOYKOW, OF BERLIN-LICHTERFELDE, GERMANY, ASSIGNOR TO MESSGERÄTE BOYKOW, G. M. B. H., OF BERLIN-LICHTERFELDE-WEST, GERMANY, A CORPORATION.

STABILIZATION OF MOVING OBJECTS SUCH AS AIRCRAFT AND WATER CRAFT.

Application filed February 4, 1927, Serial No. 165,763, and in Germany February 11, 1926.

This invention relates to damped stabilization of moving objects such as air-craft and water-craft, relatively to a given stabilization value, independently of the local field of total acceleration. In an air-craft or water-craft for instance, such a stabilization value is for example its position of equilibrium, its speed, its direction of travel, its altitude.

Stabilization devices are already known, see for instance German patent specification No. 388,402, by means of which air-craft, submarines or the like can by stabilized with reference to the aggregate of accelerating forces acting thereon, by means of two gyroscopes rotating in opposite directions in a so-called inertia frame. By the aggregate of accelerating forces I mean the combination of all the accelerations occurring, including that of the gravity of the earth, such as they act on a pendulum in the patent specification above referred to.

The well known apparatus of said patent is adapted to produce stability with reference to the position of the body to be stabilized (air-craft or water-craft). But this possibility of stability is alone insufficient for the purpose of fulfilling at the same time the conditions required by an ideal pilot for an aircraft. Such a pilot will always endeavour to maintain the craft travelling in such a manner, that is to say in such a movement as regards speed and direction, as to ensure the possibility of steering it in every respect. The pilot will then have his machine always under control, whilst in the case of a pure positional stability it may happen that the machine will lose its way, and in that manner get out of control. Moreover, the pilot will always endeavour to maintain a given direction and altitude. These are all factors or features which are not functions of the position of the craft exclusively or exclusively of its stability relatively to the aggregate accelerating forces, so that it may be stated that stabilization according to the invention consists in selecting, as factors, all those states of the machines which fulfill the conditions of an ideal pilot, that is to say travel (speed), direction and altitude.

Outwardly, the new form of stabilization is characterized by its independence of the aggregate of accelerating forces or of any position indicator which is controlled by the action of gravity, for instance independent of the use of pendulums, water levels and the like.

According to the invention, suitable measuring devices well known in themselves, such as for instance speedometers, direction indicators (compasses), altitude measuring devices, are caused to act on a device which has the tendency to change directly the position of the inertia frame with the two gyroscopes rotating in opposite directions. Such a device could be of any suitable type.

In a construction according to the invention, described hereinafter, an electro-magnetic device is so connected to the inertia frame as to exert on the inertia frame adjustable force momenta controlled by the measuring instruments. These force momenta produce, as in the prior construction mentioned, gyroscope precessions which, in their turn, are utilized for determining the position of the rudders at that time, the control of the travel or speed being also effected by means of the altitude control. In principle it is also possible to effect the regulation of the speed and altitude by an automatic regulation of the gas lever.

The electro-magnetic action on the inertia frame is effected according to this invention by means of an armature in an adjustable electro-magnetic field of forces.

According to the invention, the setting of the rudders is effected by means of a servomotor which makes the extent of setting of the rudders proportional to the precessional deflection of the gyroscopes. This servomotor may be of any suitable type, for instance, an electric one as described hereinafter. The particular construction of the servo-motor is immaterial to the principle of the invention.

Finally, the invention comprises a damping device.

A construction according to the invention is illustrated by way of example in the accompanying drawing in which:

Figure 1 shows it diagrammatically in elevation, partly in section.

Figure 2 is a diagram of connections of the device for the transmission of the action of the stabilizing forces to the inertia frame.

Figure 3 is a diagram of connections for an eddy current damping.

Figure 4 is a diagram of connections of a second damping device which acts directly on the precession axes of the gyroscopes, and Figure 5 shows the diagram of connections of the servo-motor.

In a frame 1 fixed to a suitable part of the craft is mounted on a horizontal spindle 5 the inertia frame 2 with the oppositely-rotating gyroscopes 3' and 4' enclosed in casings 3 and 4. The axes of the gyroscopes have received the reference characters 31 and 32. The frame 1 is secured to the object to be stabilized. The drawing indicates that in the particular embodiment illustrated the two gyroscopes 3' and 4' are alike, and two gyroscopes of like masses and like angular velocities (revolutions per minute) will have equal impulses, the "impulse" of a gyroscope being defined as the product of its mass and its angular velocity.

On the extension 6 of the spindle 5 is mounted at one side the armature 7, see also Figure 2, which may be a permanent magnet, or an electro-magnet or a coil. The armature 7 is situated within two field magnets 8 and 9, mounted on the frame 1, Fig. 1 showing only an arm 33 carrying the field magnet 9. Said magnets have windings 10 and 11 respectively in which the strength of current can be varied by means of adjustable resistances 12 and 13. The field magnet 8 and the armature 7 constitute a kind of coupling, by means of which the inertia frame is yieldably coupled to the object to be stabilized, for instance to an aircraft. The intensity of current in the coil 10 is determined by the desired degree of precession of the gyroscopes, that is to say by the desired sensitiveness of the device.

The magnet field 9 is electrically connected for instance to a speedometer 34 acting on a switch not shown regulating the direction of electric current in the coil 11. This direction of the current depends on the positive or negative deviation from the desired mean value of the speed. As speedometers I might use any measuring device by means of which the velocity of flow of the surrounding medium can be measured in a manner suitable for electric utilization. In place of the electric transmission I may employ any other suitable transmission adapted to rock the inertia frame 2 in one or the other direction in a similar way as the electromagnetic device shown in Fig. 2.

Between the gyroscopes 3' and 4' is arranged a bevel wheel gearing 14 which on the one hand is connected to the casings 3, 4 enclosing the gyroscopes, and on the other hand acts on a spindle 15, to the outer end of which is secured a contact arm 16 (see also Figure 5). As the gyroscopes rotate in opposite directions, their precessions and therefore the displacement imparted thereby to the casings 3 and 4 are oppositely directed, so that the spindle 15 and the contact arm 16 are turned in one or the other direction, according to the said precession, by means of the bevel wheel gearing. The arm 16 moves over contacts 17 and 18 on a disc 19 which is provided with teeth on its outer circumference and meshes with a pinion 20 on the spindle of the electric control motor 21. The electric motor is connected with a switch 35 by two pairs of leads 36 and 37. Between two pairs of contacts 38 and 39 lies a contact arm 40 rocking on an axis 41 to change the direction of revolution of the motor 21 according to the position of said arm relative to contacts 38 and 39. The source of electric power for driving the motor and the connections of the motor 21 and this source of power with the leads 36, 37 are not shown on the drawing, since every man skilled in the art will be able to make the necessary connections. The contact arm 40 is moved by two magnets 42 and 43, which are connected by leads 44, 45 and 46 to the arm 16 and the contacts 17 and 18 on the disc 19. A battery 47 is inserted in lead 45. If the gyroscopes turn the arm 16 so that it comes into touch with one of the contacts 17 and 18, the motor 21 will run in such a direction that the disc 19 brings the inserted contact again out of touch with the arm 16. In this manner by each precession of the gyroscopes only a short movement of the rudder corresponding to the precession of the gyroscopes is effected. The motor is connected by means of a gear not shown in the drawing with the horizontal rudder of the flying machine for raising or lowering the same, in order to produce a change of speed by lowering or raising the flying machine.

If it is also desired to set a given altitude for the flying machine, an altitude measuring device is caused to act on the coil 11 of the field magnet 9, so that the currents controlled by the altitude measuring device and the device for measuring the velocity are superposed, and the altitude measuring device likewise controls the horizontal rudder in the manner described above through the intermediary of the field coils 11, the precession imparted thereby to the gyroscopes and their casings 3 and 4, the gearing 14, the spindle 15, the contacts 16, 17 and 18, and the motor 21. The altitude measuring device could also be made to act on the gas lever, instead of on the horizontal rudder. In the case of speedometers this is inadvisable as the speed must also be regulated when the operation of the engine is occasionally interrupted.

If it is desired to stabilize automatically the direction as well, an apparatus similar to that described, is combined with a direction indicator, for instance a compass, and this second apparatus is caused to act on the vertical rudder. The second apparatus must be disposed relatively to the first one at an angle of 90 degrees.

For the damping of the vibrations or oscillations produced by the device described, there is used a field magnet 22 which acts on the eddy current disc 23. The latter is rotated from the spindle 5 by means of a step-up gear such as the lever gear 24 shown or by toothed wheels. In place of the eddy current brake, any other suitable brake may be employed. An eddy current brake makes possible a particularly simple adaptation of the braking force to the flying properties of the machine, to the barometric pressure and the like. This adaptation is effected according to Figure 3 by regulating the intensity of current in the coil 25 by means of the resistance 26.

In addition to the damping device just described and acting on the inertia frame, there is provided a second damping device which acts on the spindle 15 and therefore, through the bevel wheels 14, directly on the precession axes of the gyroscopes 3' and 4'. This second damping device is constituted by an armature 27 on the spindle 15 in a field magnet 28 which is connected to the inertia frame 2.

The current in the coil 29 of the field magnet can be regulated by means of a resistance 30. The adjustment or setting of the intensity of current is effected in accordance with the same principles as in the damping device at the other side of the apparatus.

Both damping devices may be used jointly or may be used singly.

The working of the device described is as follows:

In the event of the inclination or speed of the air-craft changing, a torque will be exercised on the armature 7 by the field magnets 8 and 9 This torque is transmitted to the inertia frame 2, so that the gyroscopes 3' and 4' will have precessions in opposite directions. The contact arm 16 will then be turned, according to the direction of the precession, to engage the contact 17 or 18, so that the motor 21 will start and move the horizontal rudder. As soon, however, as the motor starts, it will rotate the disc 19, and therefore the contacts 17 and 18, relatively to the contact arm 16, so that the motor will stop as soon as the rudder deflection corresponds to the gyroscope precession.

The damping devices ensure that the vibrations or oscillations of the machine will be stopped promptly. The damping may be improved by variation of the current intensities to an aperiodic damping.

I claim:

1. An apparatus for the stabilization of moving objects, such for example as air-craft or water-craft, comprising a frame mounted on the said object, two gyroscopes of the same impulse and rotating in opposite directions rockingly mounted on said frame, an instrument for measuring the state of motion of said object independently of the aggregate of accelerating forces, means intermediate said measuring instrument and gyroscope frame for rocking the latter, and means for operatively connecting said gyroscopes with a controlling member on said objects.

2. An apparatus for the stabilization of moving objects, such for example as air-craft or water-craft, comprising an inertia frame carrying two gyroscopes of the same impulse and rotating in opposite direction rockingly mounted therein, said frame being adapted to be rockingly mounted on said object, an instrument for measuring the state of motion of said object independently of the aggregate of accelerating forces, means intermediate said measuring instrument and inertia frame for rocking the frame and means for operatively connecting said gyroscopes with a controlling member on said object.

3. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions, mounted in said casings, an instrument for measuring the state of motion of said object independently of the aggregate of accelerating forces, electromagnetic means intermediate said measuring instrument and inertia frame for rocking the latter, and means for operatively connecting said gyroscope casings with a controlling member on said object.

4. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions, mounted in said casings, a measuring instrument, means intermediate said measuring instrument and inertia frame for rocking the latter, means for operatively connecting said gyroscope casings with a controlling member on said object, and means for damping the rocking movement of said inertia frame.

5. An apparatus for the stabilization of moving objects, such for example as aircraft or water-craft, comprising an inertia frame adapted to be rockingly mounted on the said object, two gyroscope casings rockingly mounted on said inertia frame, gyroscopes of the same impulse and rotating in opposite directions, mounted in said casings, a measuring instrument, means intermediate said measuring instrument and inertia frame for rocking the latter, means for operatively connecting said gyroscope casings with a controlling member on said object, and means for damping the rocking movement of said gyroscope casings.

6. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions mounted in said casings, a measuring instrument independent of the aggregate of accelerating forces, for measuring the state of motion of said object, means intermediate said measuring instrument and inertia frame for rocking the latter, said means comprising an armature connected with said inertia frame, field magnets and their electric coils connected to said objects, means controlled by said instrument for varying the current supplied to one of said coils, and means for operatively connecting said gyroscope casings with a controlling member on said object.

7. An apparatus for the stabilization of aircraft or water-craft, comprising an inertia frame adapted to be rockingly mounted on the said craft, two gyroscope casings rockingly mounted on said inertia frame, gyroscopes of the same impulse and rotating in opposite directions mounted in said casings, a measuring instrument, means intermediate said measuring instrument and inertia frame for rocking the latter, the rudder of said craft, and operating means for said rudder operatively connected with said gyroscope casings.

8. An apparatus for the stabilization of aircraft or water-craft, comprising an inertia frame adapted to be rockingly mounted on the said object, two gyroscope casings rockingly mounted on said inertia frame, gyroscopes of the same impulse and rotating in opposite directions mounted in said gyroscope frames, a measuring instrument, means intermediate said measuring instrument and inertia frame for rocking the latter, the rudder of said craft, an electro-motor for operating said rudder, and electrical means controlled by said gyroscope casings for supplying current to said motor.

9. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions mounted in said gyroscope casings, a measuring instrument, means intermediate said measuring instrument and inertia frame for rocking the latter, and operating means for a controlling member on said object controlled by said gyroscope frames proportionally to the precession of said gyroscopes.

10. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions mounted in said casings, a measuring instrument, means intermediate said measuring instrument and inertia frame for rocking said frame, an electro-motor adapted to operate a controlling member on said object, a switch adapted to be operated by said gyroscope frames according to the precession of said gyroscopes and having elongated contacts, circuits connected with said contacts and motor for supplying electric current to said motor to turn it in opposite directions, and means connected with said motor for returning said switch into position for breaking the circuit.

11. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions mounted in said casings, a measuring instrument, means intermediate said measuring instrument and inertia frame for rocking the latter, means for operatively connecting said gyroscope casings with a controlling member on said object, an eddy current disc and a magnetic field therefor, and a step-up gear intermediate said inertia frame and eddy disc.

12. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions mounted in said casings, a measuring instrument, means intermediate said measuring instrument and inertia frame for rocking the latter means for operatively connecting said gyroscope casings with a controlling member on said object, and a damping device comprising two members one connected with said inertia frame and the other one with said gyroscope casings.

13. An apparatus for the stabilization of moving objects, such for example as air-craft or water-craft, comprising an inertia frame adapted to be rockingly mounted on the said object, two gyroscope casings rockingly mounted on said inertia frame, gyroscopes of the same impulse and rotating in opposite directions mounted in said casings, a measuring instrument, means intermediate said measuring instrument and inertia frame for rocking the latter, a controlling member on said object operatively connected with said gyroscope casings, and a damping device comprising a coil and a field magnet one connected with said inertia frame and the other with said gyroscope casings.

In testimony whereof I have affixed my signature.

JOHANN MARIA BOYKOW.